United States Patent [19]

Pimshtein et al.

[11] 4,010,864
[45] Mar. 8, 1977

[54] MULTILAYER PRESSURE VESSEL

[76] Inventors: Pavel Gdalievich Pimshtein, ulitsa Kurchatova, 9, kv. 45; Marat Moiseevich Shel, ulitsa Kievskaya, 4, kv. 15; Enver Rakhmatullovich Khismatulin, ulitsa 4 Zheleznodoroshnaya, 46"b", kv. 16; Evgeny Grigorievich Borsuk, ulitsa Kurchatova, 5"v", kv. 10; Alexandr Nikolaevich Novikov, ulitsa Kurchatova, 9, kv. 41, all of Irkutsk; Viktor Matveevich Makarov, ulitsa Sakko i Vantsetti, 58, kv. 35; Boris Grigorievich Ziselman, ulitsa Inzhenernaya, 71, kv. 45, both of Sverdlovsk; Alexandr Valeryanovich Kuramzhin, ulitsa Shvernika, 1, korpus 4, kv. 43, Moscow; Viktor Grigorievich Usenko, ulitsa Kurchatova, 9, kv. 28, Irkutsk; Nikolai Kirillovich Globin, ulitsa Griboedova, 20, kv. 64, Sverdlovsk; Vladimir Viktorovich Ivantsov, ulitsa Kurchatova, 7"a", kv. 31, Irkutsk, all of U.S.S.R.

[22] Filed: Apr. 7, 1976

[21] Appl. No.: 674,606

[52] U.S. Cl. .................................. 220/3; 138/154; 138/150; 138/142; 220/83; 220/71
[51] Int. Cl.² ................... B65D 7/42; F16L 9/14; F16L 9/16

[58] Field of Search ........... 220/3, 83, 71; 138/140, 138/141, 144, 150, 154, 142

[56] References Cited

UNITED STATES PATENTS

| | | | |
|---|---|---|---|
| 2,600,630 | 6/1952 | Fergusson | 220/3 X |
| 2,652,943 | 9/1953 | Williams | 138/150 X |
| 2,888,043 | 5/1959 | Reid | 138/144 |
| 3,604,587 | 9/1971 | Pechacek | 220/3 |

*Primary Examiner*—William Price
*Assistant Examiner*—Steven M. Pollard

[57] ABSTRACT

A multilayer pressure vessel comprising a cylindrical portion formed by a pipe with roll strips wound on said pipe and welded to the bottom of the vessel and to its flange for the cover. Said roll strips are wound in layers along a helical line so that each subsequent layer is wound in a direction opposite to the preceding layer at a pitch of 0.2 to 2.2 of the inside diameter of the pipe. The adjacent coils are welded to each other on a helical line only in the roll strip forming the external layer.

The multilayer vessel according to the invention is considerably cheaper to manufacture than the known vessels.

5 Claims, 5 Drawing Figures

MULTILAYER PRESSURE VESSEL

The present invention relates to multilayer pressure vessels employed mostly in chemical and petrochemical industries.

The multilayer pressure vessels may be used to the best advantage as containers operating under high pressures, as reaction vessels and heat exchangers in the production of ammonia, in hydraulic cracking and in other chemical and petrochemical processes.

Besides, the cylindrical portion of the vessels can be used as a section of high pressure pipelines.

Widely known at present are multilayer pressure vessels used in the above-mentioned processes under the pressures ranging from 100 kgf/cm$^2$ to 400 kgf/cm$^2$. The inside diameter of the cylindrical portion in such vessels reaches 4000 mm while the cylindrical portions used as sections of high pressure pipelines can have an inside diameter of 2000 mm aproximately. These vessels are 5 to 40 mm in length, same as the sections of high pressure pipelines.

The wall thickness of such a vessel reaches 500 mm.

An exemplary use of such a vessel may be an ammonia synthesis column which has an inside diameter of 2400 mm, a wall thickness of 270 mm and a length of 24 m at a daily output of 1360 tons of ammonia.

Widely known in the previous art are pressure vessels comprising a cylindrical portion formed by a pipe with a welded bottom at one end and a flange or throat for the cover at the other.

The multilayer cylindrical portion of the vessel may vary in design. It can be made in the form of multilayer shells fitted around a pipe and welded to one another along circular seams or in the form of roll strips wound spirally on the pipe and welded to one another along spiral welds.

The multilayer vessels are considerably more efficient than the solid ones, such as forged, forged-and-welded, stamped-and-welded, their advantage being in that their manufacture does not call for heavy metallurgical and press-forging equipment. They are charactirized by a high metal utilization factor. The multilayer construction of the cylindrical portion of the vessel reduces considerably the amount of machining required in manufacturing the vessel.

Besides, the vessels whose cylindrical portion is made of thin sheets, strips or bands are considerably cheaper and lighter and feature better mechanical properties than the vessels with thick forged or stamped solid walls.

The multilayer pressure vessels may have a considerable size and wall thickness. Their reliability and safety is higher than those of the solid vessels.

However, the manufacture of multilayer pressure vessels involves certain difficulties.

For example, when the multilayer cylindrical portion of the vessel is made up of shells, each shell has to be welded to the adjacent shell by a circular seam. The shells vary in design.

Rather commonly known are multilayer shells assembled from single-layer shells by shrinking. Sometimes the shell sectors are placed on the pipe, layer after layer, and welded by longitudinal seams along the generating lines. In some cases the pipe is wound with layers of a roll strip until the vessel wall reaches the desired thickness. The length of each multilayer shell of this type may reach 3 m. Therefore, in manufacturing a pressure vessel, the shells must be welded to one another by circular seams. The thickness of the circular seams between the shells should be equal to the thickness of the wall and reaches 300–500 mm. The welding of such seams is a complicated problem and requires a large amount of welding work and a necessity for heat treatment of the welds. For example, the weight of the built-up metal in the circular welds of the above-mentioned ammonia synthesis column may reach 13 t. The amount of welding work used in making the cylindrical portion of the vessel reaches 60% of the total work. Besides, the circular seam is the most vulnerable element of these vessels.

Therefore, attempts have been made to reduce the scope of welding work in the process of manufacturing the multilayer pressure vessels. For this purpose the pipe of the vessel has been wound with a profiled band along a helical line and the ends of the band have been welded to the ends of the vessel, i.e., to its bottom and the flange. The band has been comparatively narrow and provided with alternating projections and depressions on both sides.

The size and shape of the projections and depressions have been selected so as to make them match with one another in the process of winding. The first layer of the profiled band has been wound under tension with the second heated layer so as to fit the projections of the second layer into the depressions of the first layer thus overlapping the gap between the adjacent coils of the first layer of the band.

The next layers of profiled bands have been wound in a similar manner until the vessel walls have been built up to the required thickness. All the layers of the profiled bands have been wound in one and the same direction and their ends have been secured by welding.

The employment of profiled bands for winding on the tubular portion of the vessel makes it possible to dispense with solid circular welds, to use a high-strength band, to raise the metal utilization factor and to simplify considerably the manufacture of multilayer pressure vessels.

However, though featuring a number of advantages, these vessels are not devoid of certain disadvantages.

For example, the manufacture of bands with an accurately shaped profile calls for the use of special metalworking equipment (rolling mills). Besides, the vessels are not sufficiently stiff and strong axially. The profiled bands are placed on one another, forming bulging locking joints. The basic axial load in such vessels is taken by the pipe which, therefore, has to be made with thick walls which increase the weight of the vessels.

The Patent No. 698851, Germany, covers a multilayer pressure vessel comprising a cylindrical portion formed by a pipe wound helically with roll strips so that the helix of each subsequent layer is counteropposed to that of the preceding layer. The coils of each roll strip are welded to one another along a helical line. The ends of each roll strip forming the layers of the external side surface of the pipe are welded, respectively, to the vessel bottom and to its flange contacting the cover.

The use of non-profiled strips has made it possible to simplify considerably the manufacture of the multilayer pressure vessel while spiral welds have ensured its requisite axial strength.

However, even these improvements have failed to produce a vessel capable of meeting the modern requirements.

A large amount of welding has made these vessels considerably more expensive and increased the time required for their manufacture. Thus, in the process of winding the roll strip it was necessary to weld up all its coils and to dress the welds flush with the base metal before winding the next layer. The performance of such welding work calls for the employment of skilled welders, a great amount of welding material and a considerable consumption of electric power.

Besides, the roll strips used for these vessels must be made of an easily weldable metal. The winding speed of the roll strips is limited not only by the speed of welding and weld dressing but also by the necessity for trimming the ends of the strips in order to give them the shape suitable for joining them to the bottom of flange of the vessel. All these difficulties step up considerably the manufacturing cost of the multilayer pressure vessels and interfere with raising the productivity of labour.

Of late, the demand for multilayer pressure vessels is constantly growing due to a wider field of their employment. Accordingly, this has set up a problem of manufacturing the multilayer pressure vessels in a comparatively short time and of ensuring their reliability at pressure reaching 1500 kgf/cm$^2$. A need has arisen for making the vessels up to 6 m in diameter and for cutting down their manufacturing cost. The main object of the present invention is to provide a multilayer pressure vessel which would be more reliable in operation than the known vessels of the similar type.

Another no less important object of the invention lies in reducing considerably the manufacturing cost of multilayer pressure vessels.

An important object of the invention lies in curtailing the time required for the manufacture of said vessels by diminishing the amount of welding work due to a considerable reduction of welds and, consequently, of the amount of machining.

Another object of the invention is to reduce the weight of the multilayer pressure vessel.

And still another object of the invention is to reduce the consumption of welding materials dozens of times and to decrease the consumption of electric power due to speeding up the manufacture of multilayer pressure vessels.

This and other objects are achieved by providing a multilayer pressure vessel comprising a cylindrical portion formed by a pipe which is wound helically with layers of roll strips, the helices being counteropposed in the adjacent layers, the ends of each roll strip forming a layer which is welded, respectively, to the bottom of the vessel and to its flange for the cover wherein, according to the invention, the roll strips are wound at a pitch ranging from 0.2 to 2.2 the inside diameter of the pipe, all the adjacent coils being welded to each other along the helical line only in the roll strip which forms the external layer.

After prolonged investigations and a multitude of experiments, the authors of the present invention have established that it is possible not to weld together the coils of the roll strips forming the internal layers provided the winding pitch and the inside diameter of the pipe are in a certain relation to each other, said relation having been found by the authors.

This is attributable to the fact that the criss-crossing roll strips wound helically on one another form a rigid system which, owing to the tension of the roll strips and the forces of friction arising between them takes both the circular and axial loads of the internal pressure in the vessel when the ratio of the winding pitch to the diameter ranges from 0.2 to 2.2, and ensures the requisite strength of the vessel.

If the found ratio is reduced below 0.2, the axial strength of the vessel will not be ensured even with a large number of wound layers.

If the found ratio is increased above 2.2, the vessel may be distorted to a barrel shape by internal pressure.

The number of the winding layers depends on the preassigned thickness of the vessel wall and on the thickness of the strip used. The beginning and the end of each roll strip are trimmed so that the edges of the first and last coil would join the flange and the bottom of the vessel, respectively. Each roll strip is welded by a circular seam along the edges of the end coils to the flange and bottom of the vessel.

In the case of vessels of extra-large diameter it is desirable that the roll strips should be wound in the direction from the pipe to the external layer in alternating pairs of layers made of wide and narrow roll strips; the narrow roll strips may be made of a stronger material and wound with a higher tension than the wide roll strips.

In this case the pairs of narrow roll strips will bear the main circular load whereas the wide roll strips which may be made of a weaker material than the narrow roll strips will bear the axial loads owing to the forces of friction, a higher rigidity in the axial direction, and a larger winding pitch.

All the above factors widen the nomenclature of the materials that may be utilized for making the roll strips and make it possible to lighten the vessels considerably.

In a multilayer pressure vessel the roll strips in at least one pair of layers may be wound along a multiple-start helical line.

The multiple-start winding makes it possible to use a narrower but strong strip, to reduce the tension forces in the course of winding and to ensure the required ratio between the winding pitch and the inside diameter of the vessel pipe, thereby increasing the axial strength margin of the vessel.

It is practicable that at least one end portion of the roll strip in a multilayer pressure vessel should be made from a sheet blank in the form of a right triangle one leg of which is equal to the width of the strip end and is welded to it while the hypotenuse is equal to the circumference of the layer formed by this roll trip and is welded either to the flange or the bottom of the vessel.

This design of the vessel facilitates its manufacture since its dispenses with cutting the roll strip along a diagonal line whose length is equal to the circumference of the given layer. In the case of large vessels the length of this cut reaches 9 – 10 m which is difficult to perform on the wound strip. The design according to the invention allows the jointing element to be prepared in advance and welded to the roll strip which has been cut crosswise at a right angle. In the course of winding it is easy to weld the triangular sheet along the hypotenuse to the end portion of the vessel.

It is preferable that the first and last coils of the roll strips forming the intermediate layers should be welded to the adjacent coils along a helical line to the point where it intersects the plane which is perpendicular to the longitudinal axis of the vessel and located at a distance equal to the inner radius of the vessel from the point where the roll strip is welded to the vessel bottom or flange.

The fastening of the end coils of the roll strip to the adjacent coils makes it possible to wind them with a lower tension than the coils located in the middle of the layer and ensures uniform axial strength throughout the length of the cylindrical portion of the vessel.

Thus, the manufacture of the multilayer pressure vessel according to the invention is simpler and cheaper than the manufacture of the similar vessels known heretofore.

Now the invention will be described in detail by way of examples with reference to the accompanying drawings, in which.

EXAMPLE 1

Figure 1:
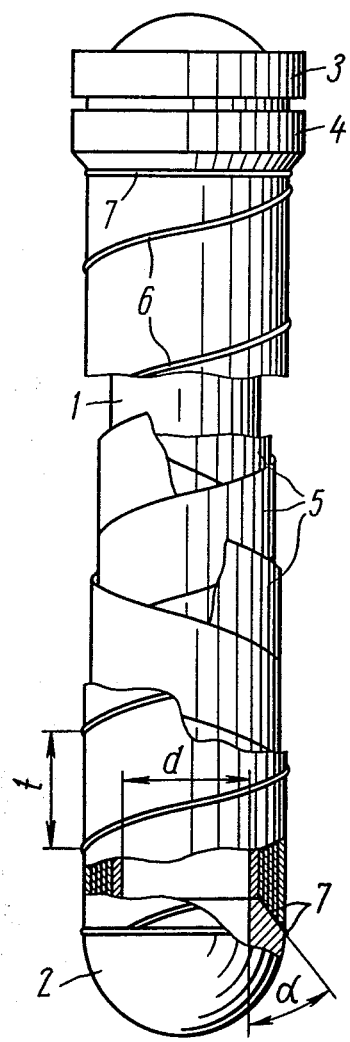
FIG. 1 shows a multilayer vessel with cutouts illustrating the direction and winding pitch of the roll strips in various layers.

A multilayer pressure vessel comprising a cylindrical portion formed by a pipe 1 (FIG. 1), a bottom 2 and a cover 3 adjoining the flange 4 of the pipe 1 which is wound with layers of roll strips 5.

Each roll strip 5 is wound on the pipe 1 along a helical line at a pitch t ranging from 0.2 to 2.2 of the inside diameter $d$ of the pipe 1. In the adjacent layers the roll strips 5 are wound along counteropposed helical lines, i.e., each subsequent layer of the roll strip 5 is wound in a direction opposite to that of the preceding layer. The beginning and the end of each roll strip 5 forming a layer are welded, respectively, to the bottom 2 and the flange 4. All the adjacent coils are welded to one another by a welded seam 6 along a helical line only in the roll strip forming the external layer. In the other roll strips which form the internal layers the coils located in the middle of the layer are not welded to one another. The beginning and the end of each roll strip 5 are trimmed in such a way that the edge of the first coil joins the flange 4 and the edge of the last coil joins the bottom 2 both edges being welded by circular seams 7. The bottom 2 is beveled at an angle $\alpha$ from 30° to 60° to make room for the circular welding seams 7. In a similar way the ends of the roll strips 5 are secured to the flange 4 with the corresponding displacement of the roll strip 5 in each subsequent layer.

The gap for welding the circular seam 7 is the same in each layer, varying from 8 to 10 mm for the roll strip 4 – 6 mm thick. This ensures the thinnest circular seam, reduces the residual welding stresses and dispenses with the necessity for heat-treating the circular seams, all this reducing the manufacturing cost of the multilayer pressure vessel.

The roll strips 5 wound in the manner described above form a strong structure which, owing to the tension of the strips and the forces of friction between them, bears the circular and axial loads caused by internal pressure in the vessel and guarantees the required strength of the vessel.

Observance of the above-cited ratios cancels a considerable amount of welding work and reduces the manufacturing cost of multilayer pressure vessels.

It is preferable that the vessel should be made from the roll strips 5 of the same width and of the same material.

However, other versions of the vessels according to the invention may also prove feasible.

EXAMPLE 2

Figure 2:
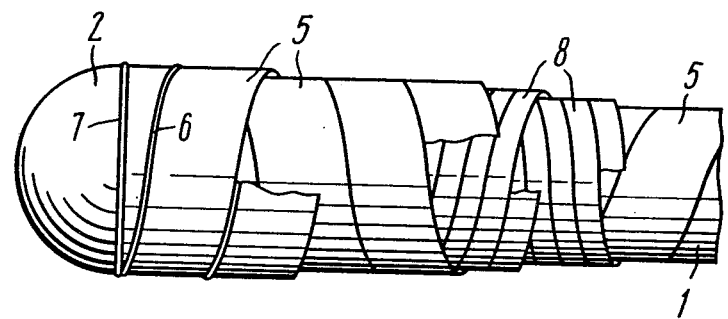
FIG. 2 shows a portion of a multilayer vessel with cutouts illustrating layers consisting of wide and narrow roll strips.

A multilayer pressure vessel may have roll strips 5 (FIG. 2) wound in the direction from the pipe towards the external layer in the alternating pairs of layers consisting of wide strips 5 and narrow strips 8 wound in the opposite directions within each pair. The narrow roll strips 8 are made of a stronger material and wound with a heavier tension than the wide roll strips 5.

If the narrow strips are made from an extremely strong material, the strength characteristics of such a vessel are improved. The ultimate strength of the material from which the walls of such a vessel are made is an average between the ultimate strength of the narrow row strips 8 and that of the wide roll strips 5. This reduces the thickness of the vessel wall and the total weight of the vessel. Besides, winding the narrow strip 8 with preliminary tension improves the tight fitting of the layers with a resultant increase in the reliability of such a vessel.

EXAMPLE 3

Figures 3, 5:
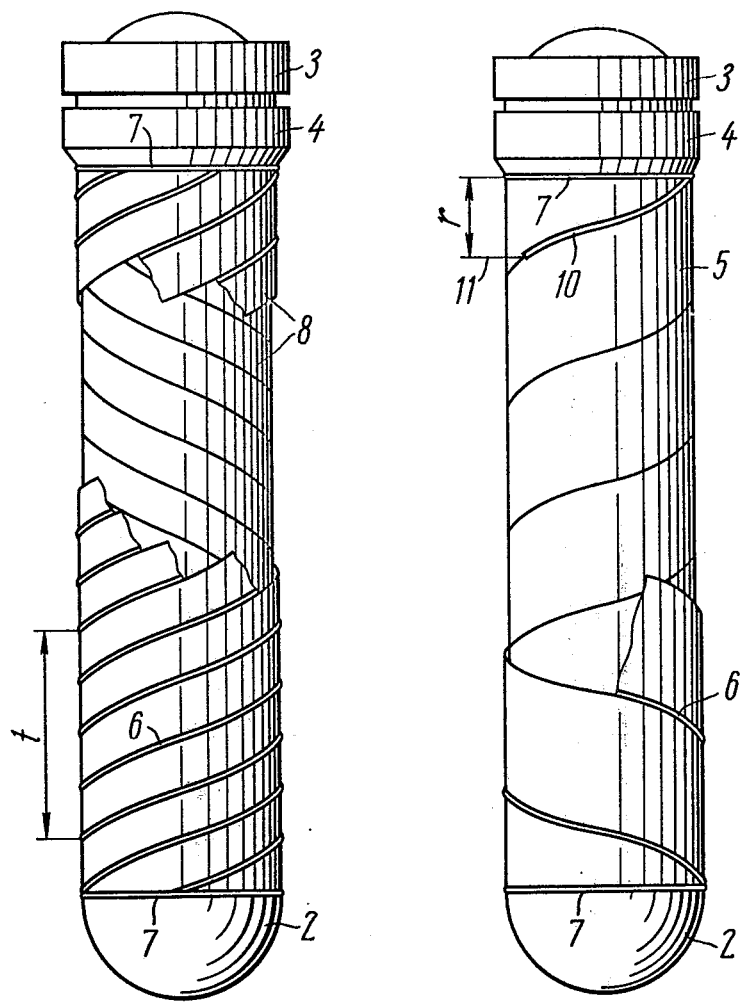
FIG. 3 shows a multilayer vessel with a cutout illustrating layers wound along a multiple-start helical line.
FIG. 5 shows a multilayer vessel with a cutout illustrating a welding seam between the end coils in the internal layer of the roll strip.

A multilayer pressure vessel may comprise narrow roll strips 8 (FIG. 3) wound along a multiple-start helical line at least in one pair of layers.

Such a design of the vessel is suitable for the use of narrow high-strength roll strips 8 wound with a high degree of tightness. The forces of tension of individual roll strips 8 in a layer may be chosen so that all the layers will be equally loaded under the effect of the internal pressure which will improve the utilization of the material of the vessel wall and, consequently, reduce the weight of the vessel and raise its reliability.

EXAMPLE 4

Figure 4:
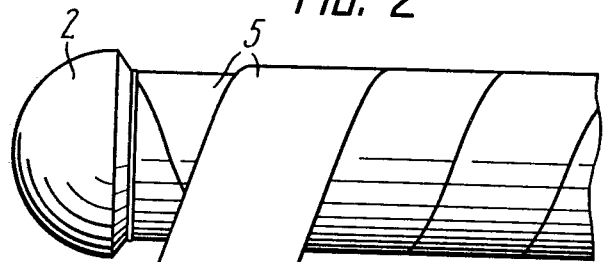
FIG. 4 shows a portion of the vessel with the triangular end portion of the roll strip.
Figure 4:
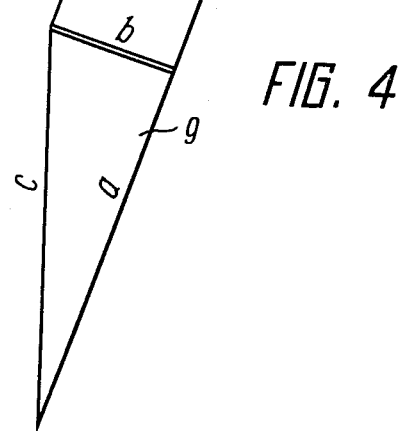

In a multilayer pressure vessel at least one end of the roll strip 5 (FIG. 4) can be cut in a crosswise direction and provided with a welded sheet blank 9 in the form of a right triangle in which $a$ and $b$ are the legs and $c$ is the hypotenuse.

The leg $b$ is equal to the width of the roll strip 5 and is butt-welded to the latter. The hypotenuse $c$ of the triangular sheet blank 9 is equal in length to the circumference of the next wound layer.

This form of the end of the roll strip 5 facilitates the manufacture of the vessel since it excludes precision cutting of the strip at an angle in the course of winding. The end of the roll strip 5 cut across its width can be welded to the preceding layer after which the leg $b$ of the triangular sheet blank 9 can be welded to said layer.

As a result, the ends of the layers prove to be secured to one another.

The hypotenuse $c$ is welded by a circular seam to the bottom 2 or the flange 4.

The above-described design of the vessel reduces its manufacturing cost.

EXAMPLE 5

In a multilayer pressure vessel the first and the last coils of the roll strips 5 (FIG. 5) forming the intermediate layers are welded correspondingly to the adjacent coil by the welding seam 10 along a section of the helical line to the point of its intersection with the plane 11 which is perpendicular to the longitudinal axis of the vessel and located at the length equal to the inner radius r of the vessel from the point where the roll strips are welded, respectively, to the flange 4 and the bottom 2.

This design of the vessel raises its reliability and facilitates its manufacture since it permits a lower tightness of fitting at the beginning and the end of winding of each layer; this also yields a certain cut in the manufacturing cost of the vessels and allows the use of a simpler manufacturing equipment.

In all the above-described versions of the vessels according to the invention the roll strips must be wound with a certain tension intended to ensure tight fitting of the layers and thus to retain the forces of friction between them. The ratio between the winding pitch and the inside diameter of the vessel according to the invention is optimum from the viewpoint of guaranteeing the circular and axial strength of the vessel.

Owing to the fact that the adjacent layers of the roll strips are wound in the mutually opposite directions, each layer tends to untwist under the effect of pressure, also in the mutually opposite directions. This originates the forces of friction between the layers, said forces depending on the radial stresses in the vessel wall and the coefficient of static friction between the contacting layers.

The total force of friction depends on the number of winding layers. The greater the number of layers, the stronger the force of friction because the friction forces are occasioned between each pair of contacting surfaces. Besides, the force of friction depends on the winding pitch due to an increase in the coil overlapping area, said force being determined in the given instance as a product of the coil overlapping area, pressure per unit of area and coefficient of static friction.

If the number of coils, their overlapping areas or winding pitch are sufficiently large, the forces of friction in the axial direction may prove to be much stronger than the axial force stretching the vessel under the effect of internal pressure.

The axial strength of the vessel is ensured if the forces of friction are stronger than the total force stretching the vessel axially under the effect of internal pressure. The axial strength will be guaranteed if the forces of friction are two or three times as strong as the axial stretching forces. With a sufficiently large number of winding layers the above-mentioned friction force margin can be attained when the winding pitch is considerably smaller than the theoretical optimum pitch-diameter ratio, i.e., 2.2.

The minimum recommended pitch-diameter ratio is 0.2. This ratio is capable of ensuring the axial strength of the vessel when the number of winding layers exceeds 40. The smaller number of layers requires a larger pitch-diameter ratio, up to 2.2 at a minimum number of layers.

The authors have made and tested a number of multilayer pressure vessels with various ratios between the winding pitch and the inside diameter of the vessel. For example, vessels with the t:d ratio of 0.25, 0.5, 1.0, and with 26 layers.

In the course of tests the vessels have been subjected to cyclic loads under 1.25 rated service pressure. The number of loading cycles ranged from 1000 to 2000 for different vessels.

Besides, the vessels have been pressure-tested under 1.5–1.8 rated service pressure. After the cyclic tests the vessels have been subjected to destruction tests. The destruction pressure in all vessels proved to be near to the rated destruction pressure.

The tests of the vessels of different sizes have proved the possibility of efficient winding of the layers which fit sufficiently tight to one another. The tests have been accompanied by visual and extensometric investigations which have proved high reliability of the vessels under repeated loads.

The tests have shown that the expenses for manufacturing this type of vessels are considerably lower than those required for making other designs of multilayer vessels.

Thus, as compared with the vessels made from individually wound shells, the manufacturing cost of the vessels according to the invention is reduced 17–20%, the manufacturing cycle is reduced 50%, the amount of labour for making the cylindrical portion of the vessel is 2–3 times smaller and the metal utilization factor is increased. The consumption of welding materials is decreased dozens of times and so is the consumption of electric power.

The design of the vessel according to the invention creates favourable possibilities for making extra-large vessels at the assembly site.

The pressure vessels according to the invention for various chemical, petrochemical and other industries are sufficiently simple to manufacture. The reliability of their design is not inferior to that of other multilayer vessels and is higher than in the case of solid vessels.

Consequently, the multilayer pressure vessels according to the invention are by far more efficient than the other known vessels and can be used successfully in various branches of industry.

What we claim is:

1. A multilayer pressure vessel comprising a cylindrical portion formed by a pipe with a flange; the bottom of said vessel adjoining said cylindrical portion; a cover adjoining said cylindrical portion at the side of the flange; roll strips wound on said cylindrical portion in layers along a helical line which is counteropposed in the adjacent layers, the winding pitch ranging from 0.2 to 2.2 of the inside diameter of said pipe; the ends of each of said roll strips forming the layers on said cylindrical portion of the vessel welded, correspondingly, to said bottom and flange of the vessel; a roll strip forming the external layer on said cylindrical portion of the vessel, all the coils of said strip being welded to one another on a helical line; roll strips forming the internal layer on said cylindrical portion of the vessel, the intermediate coils of said strips being not welded to one another.

2. A multilayer pressure vessel according to claim 1 wherein said roll strips are wound in layers in the direction from the pipe towards the external layer and consist of alternating pairs of layers of wide and narrow roll strips, said narrow roll strips being made of a stronger material and wound with a higher tension than said wide roll strips.

3. A multilayer pressure vessel according to claim 2 wherein said roll strips at least in one pair of layers are wound along a multiple-start helical line.

4. A multilayer pressure vessel according to claim 1 characterized in that at least one end portion of said roll strip is made of a sheet blank in the form of a right triangle whose one leg is equal in width to the end of said roll strip and is welded to it while the hypotenuse is equal in length to the circumference of the layer formed by this roll strip and is welded, correspondingly, to the flange or the bottom of the vessel.

5. A multilayer pressure vessel according to claim 1 wherein the first and the last coils of said roll strips forming the intermediate layers are welded to their respective adjacent coils along a section of the helical line to the point of its intersection with a plane which is perpendicular to the longitudinal axis of the vessel and located at a distance equal to the length of the inner radius of the vessel from the point where said roll strip is welded correspondingly to said bottom or flange of the vessel.

* * * * *